(12) United States Patent
Chiba et al.

(10) Patent No.: US 7,648,659 B2
(45) Date of Patent: Jan. 19, 2010

(54) METHOD OF PELLETIZING FRICTION MATERIAL AND METHOD OF MANUFACTURING PRELIMINARILY FORMED MATERIAL FOR FRICTION MATERIAL

(75) Inventors: Masanori Chiba, Gunma (JP); Kaoru Tosaka, Gunma (JP)

(73) Assignee: Nisshinbo Industries, Inc., Tokyo (JP)

( * ) Notice: Subject to any disclaimer, the term of this patent is extended or adjusted under 35 U.S.C. 154(b) by 1057 days.

(21) Appl. No.: 11/012,564

(22) Filed: Dec. 15, 2004

(65) Prior Publication Data

US 2005/0200042 A1 Sep. 15, 2005

(51) Int. Cl.
*C08J 5/14* (2006.01)
(52) U.S. Cl. .................. 264/118; 264/109; 264/140
(58) Field of Classification Search .............. 264/109, 264/140, 122, 118
See application file for complete search history.

(56) References Cited

U.S. PATENT DOCUMENTS

| | | | | |
|---|---|---|---|---|
| 5,746,957 A | * | 5/1998 | Fanelli et al. | 264/109 |
| 6,146,560 A | * | 11/2000 | Behi et al. | 264/37.1 |
| 6,268,412 B1 | * | 7/2001 | Zedalis et al. | 524/27 |
| 6,669,880 B2 | * | 12/2003 | Behi et al. | 264/115 |
| 6,773,799 B1 | * | 8/2004 | Persson et al. | 428/323 |
| 2005/0035482 A1 | * | 2/2005 | Hartmann et al. | 264/140 |
| 2005/0048094 A1 | * | 3/2005 | Jadhav et al. | 424/405 |
| 2005/0104244 A1 | * | 5/2005 | Yoon et al. | 264/115 |

FOREIGN PATENT DOCUMENTS

| | | |
|---|---|---|
| JP | 54-138053 | 10/1979 |
| JP | 2993362 | 10/1999 |
| JP | 3409426 | 3/2003 |

* cited by examiner

*Primary Examiner*—Yogendra Gupta
*Assistant Examiner*—Emmanuel S Luk
(74) *Attorney, Agent, or Firm*—Muramatsu & Associates

(57) ABSTRACT

To provide a method of pelletizing friction material that makes it possible to preliminarily form friction materials after pelletizing, and a method of producing preliminarily formed friction material. The method of pelletizing friction material includes the steps of: pressing powdery friction material without heating, in which plurality of materials are mixed, with 0.1 to 5.0 weight-percent of solvent; and grinding the pressed and hardened material. When handling powdery friction material, in which plurality of materials including at least one sticky material are mixed, less than or equal to 5.0 weight-percent of solvent is added in the pressing process. Feeding the pelletized material in a metal mold and pressing the material without heating produce a preliminarily formed friction material.

20 Claims, 4 Drawing Sheets (a)

(b)

(c)

METHOD OF PELLETIZING FRICTION MATERIAL AND METHOD OF MANUFACTURING PRELIMINARILY FORMED MATERIAL FOR FRICTION MATERIAL

BACKGROUND OF THE INVENTION

1. Field of the Invention

The present invention relates to friction material such as brake pads for automobiles and clutch facings, and more particularly, to a method of pelletizing friction material and a method of manufacturing preliminarily formed material for the friction material.

2. Description of the Related Art

The friction material is obtained by forming powdery material comprising fibrous material such as organic fibers, inorganic fibers, and metal fibers, friction adjusting agent including graphite and barium silicate, filler such as natural rubber and synthetic rubber, and thermosetting resin including phenol resin as a binder.

Hardening the powdery friction material under pressure and heat, and adhering the hardened material to a steel backing plate produce a disk brake pad.

FIG. 2 shows a backing plate used for a conventional disk brake pad. Striking a plate with predetermined shape from steel plate for automobiles or structural steel plate for machinery through press, and drilling two binder holes 2, 2, obtain the backing plate 1 shown in the figure.

FIGS. 3(a) to 3(c) show the construction of the press for adhering the friction material to the backing plate 1. The press is provided with an upper die 5, a frame 6, and a plunger 7. The frame 6 is fixed, and the upper die 5 and the plunger 7 are vertically movable. The upper die 5 is provided with two projections 8 at positions corresponding to the binder holes 2 of the backing plate 1.

To adhere the friction material to the backing plate 1, generally, two methods are applicable. In the first method, the backing plate 1 is directly piled upon the powdery material a, and the both are pressurized and heated to combine them with each other. To be concrete, as illustrated in FIG. 3(a), the plunger 7 is maintained at a predetermined height, and the powdery material a is fed to the frame 6 and is cut by rubbing to be flat. Then, as shown in FIG. 3(b), the steel backing plate 1 is held on the frame 6, and as shown in FIG. 3(c), the upper die 5 is lowered, and simultaneously, the plunger 7 is lifted, and the backing plate 1 and the powdery material a are heated. Melting and hardening thermosetting resin contained in the friction material a allows the friction material A to be adhered to the backing plate 1. At this moment, the friction material A enters into the binder holes 2, 2 also to improve binding force. The projections 8 are formed to substantially uniformly expand the friction material A, which enters the binder hole 2, 2.

In the second method, the powdery friction material a is fed to a metal mold and is preliminarily formed therein under pressure without heat, and the preliminarily formed material is piled upon the backing plate 1 in another metal mold and is adhered thereto under pressure and heat.

FIG. 4 shows the preliminarily formed friction material, in which (a) is the plan view, and (b) is the front view. The preliminarily formed material 3 has the same shape as final products, but its density is low, and its thickness T is approximately double in comparison to that of the final product that is adhered to the backing plate 1 under pressure and is pressed to have predetermined density. Further, the preliminarily formed material 3 is provided with mounds 4, 4 at the positions corresponding to the binder holes 2. The mound 4 has a wide base portion, but the diameter of the top thereof is smaller than that of the binder hole 2, so that the mound 4 can easily enter in the binder hole 2.

The preliminarily formed material 3 is fed to the frame 6 shown in FIG. 3, and the backing plate 1 is placed on the frame 6. Then, the upper die 5 is lowered, and the plunger 7 is lifted to adhere the friction material A to the backing plate 1 under pressure and heat. The mounds 4, 4 enter in the binder holes 2, 2 and are solidified therein to improve binding force between them.

The first method is advantageous in that the preliminarily forming process can be omitted. But, the method is not suitable for multiple productions. The "multiple productions" mean a method of preparing plurality of backing plates; placing a frame on each of the backing plates; feeding friction material in the frame; and adhering the friction material to the backing plate under pressure and heat to produce plurality of disk brakes at a time. Therefore, in the multiple productions of the first method, plurality of feeding devices are necessary since the friction materials are fed to plurality of metal molds. In addition, after the materials are fed, it takes time to cut by rubbing, for surface flatness, which causes the metal molds to be cooled.

On the other hand, in the second method, it is possible to store the preliminarily formed material produced, and the process of cutting by rubbing by the feeding device in the first method is unnecessary. Further, many disk brake pads can be produced at one time, resulting in improved working efficiency.

However, in the above methods, the powdery material contains sticky material such as NBR that is not vulcanized, so that such material sticks on the wall of the metal mold at the preliminarily forming process, which causes the preliminarily formed material to easily be broken when removed from the metal mold. This phenomenon may occur because sticky material contained in the friction material becomes finer than the surface of the metal mold, and enters concave portions on the surface of the metal mold, so that the sticky material expands or extends through pressing.

Meanwhile, disk brake pads are required to have stable braking capacity in wide temperature range since brakes with high performance have been used as the performance of vehicles have progressed. In this connection, friction material with base material of metal fibers with high heat-conductivity has high heat-conductivity itself, so that the heat generated on its friction face easily reaches the face contacting the plate through the friction material. As a result, the heat reduces the binding force between the friction material and the plate.

To solve the above problem, material laying stress on frictional efficiency has been used on the friction face side, and material laying stress on adhering performance to a plate and adiabatic performance has been used on the contact face. That is, friction material has been doubled or multiplied. One of such multiplied disk brake pads is disclosed in Japan Patent No. 3,409,426. In this patent, a friction material is divided into layers of pelletized material and material that is not pelletized, or one of the layers on the backing plate side after formation with pressure and heat is reduced in porosity in comparison to a layer on the friction side.

Mixing several materials, with different specific gravity, such as fibrous materials, friction adjusting materials, fillers, and thermosetting resins, as described above, produces powdery friction material. Therefore, when the friction material is left as it is, material with large specific gravity sinks and material with small specific gravity floats, that is, the friction material easily segregates, which causes its quality to vary widely.

In order to prevent such segregation, it is known that powdery material is firstly pelletized to tablets. In other words, powdery material is pelletized to small grains before it does not segregate. One of the pelletizing methods is disclosed in Japanese Patent Application Laid-open No. Showa 54-138053. In this document, asbestos and phenol resin powder are mixed; solvent that does not excessively dissolve the phenol resin is added to give moisture; and the mixture is pressed out of a pressure hole and is cut to produce pellets. With these pellets, the segregation can be prevented, and friction material with uniform quality can be obtained.

In another method of pelletization disclosed in Japan Patent No. 2,993,362, powdery material is heated at a temperature above the melting point of thermosetting resin and below the hardening temperature thereof; and the material is pressed to be discharged from a pressure hole; and the discharged material is cut to desired length to pelletize the material.

However, with the both methods disclosed in the second and third documents, pelletized material can not be preliminarily formed, because even through pressure is applied to the pelletized material desired shape is not to be maintained due to weak binding force.

In order to maintain the shape of the preliminarily formed material, it is necessary that fibers contained in the friction material should be interwound with each other. However, with the above methods, the fibers are coated with resin and rubber, which prevents the interwindings between the fibers.

SUMMARY OF THE INVENTION

The present invention has been made to solve the above problems, and it is an object of the present invention to provide a method of pelletizing friction material that makes it possible to preliminarily form friction materials after pelletizing, and to provide a method of producing preliminarily formed friction material.

To accomplish the above objective, a method of pelletizing friction material according to the present invention comprises the steps of: pressing powdery friction material without heating, in which plurality of materials are mixed, with 0.1 to 5.0 weight-percent of solvent; and grinding the pressed and hardened material.

Another method of pelletizing friction material according to the present invention comprises the steps of: pressing powdery friction material without heating, in which plurality of materials including at least one sticky material are mixed, with less than or equal to 5.0 weight-percent of solvent; and grinding the pressed and hardened material.

Adding a small amount, that is 0.1 to 5.0 weight-percent of solvent to the friction material made from plurality of materials allows the friction material to be hardened under pressure. Then, the hardened material is ground and pelletized to obtain pellets of the friction material.

Adding sticky material such as NBR to powdery material causes the powdery material to be hardened under pressure without any solvent. Adding a small amount, that is 5.0 weight-percent of solvent causes the powdery material to be hardened more easily. This is because the sticky material becomes like soft clay, and expands among other materials to solidify the powdery material since the material works like bonding agent. Then, the solidified material is ground through an appropriate measure to pelletize the material. In the present invention, at that moment, the pelletization is performed with less than or equal to 0.1 to 5.0 weight-percent of solvent (without solvent when containing sticky material) and without heating the metal mold and the like, so that no chemical change occurs. The fibers are coated with the sticky material, but the coating is not so strong and the connection between them is weak, so that after pelletization, interwindings between the fibers are possible to achieve preliminary formation. Further, the sticky material expands among other materials, the layer of the friction material becomes thin, and no material enters rough wall face of the metal mold, which can maintain the shape of the preliminarily formed material.

In the above method according to the present invention, the pressing step can be performed by allowing the powdery material to pass between pressing rollers.

A press may be used to pressurize the powdery material fed in the metal mold. Further, passing the material through pressing rollers applies large pressing force to the material, resulting in high productivity. In addition, the pelletized friction material becomes scale-like and even-sized pelletized materials with little fine powder will be obtained.

In the aforementioned method, pressure applied in the pressing step can be between 50 MPa and 300 MPa. And, pressing force applied to the pressing rollers may be between $5 \times 10^3$ N/cm and $3 \times 10^4$ N/cm.

The pressing force applied to the powdery material is indicated as pressure when pressed by a press, and is indicated as force per unit length when pressed by pressing rollers. Substantially, the above pressure and pressing forces may be almost on the same level. This pressure or pressing force is several time as large as the pressure applied when producing preliminarily formed material from powdery material.

Further, in the method according to the present invention, it is possible to use several kinds of powdery materials with different compositions as friction material, and each of the powdery friction materials can separately be pelletized.

Dividing powdery materials into one for an insulator on the back plate side, of which composition is superior in bonding force and insulation, and another on the friction face side, of which composition is superior in friction, and separately pelletizing those materials can separately producing preliminarily formed materials for the insulator and for the friction face. The preliminarily formed materials for insulator and for friction face produced in the above method can be piled with each other and attached to the back plate.

With this invention, pelletization allows friction material to be uniform. And, when powdery material or granular material is fed to a metal mold, material on the upper surface of the metal mold is cut by rubbing with a plate or the like to make the quantity of the material in the mold uniform. In such a case, powdery material is inferior in fluidity and the cut plate catches fibers contained in the material, which makes it difficult to smoothly cut the material by rubbing. On the other hand, with the present invention, pelletization causes the fibers of the material to enter into the pellet, which improves fluidity and prevents the fibers from being caught by the cut plate. As a result, uniform quantity of material is easily secured.

In addition to the above, in powdery material, fibers are susceptible to stand side by side, that is, the fibers on the whole of the friction material are susceptible to orient in the same direction, which reduces the strength of the friction material. On the contrary, with the present invention, even though the directions of the fibers are uniform in a pellet, the directions of the pellets are random, so that the directions of the fibers become random on the whole, which improves strength and wear resistance. Further, pelletization causes the quantity of dust to be reduced.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Now, preferred embodiments of the present invention will be explained with reference to drawings.

Figure 1:
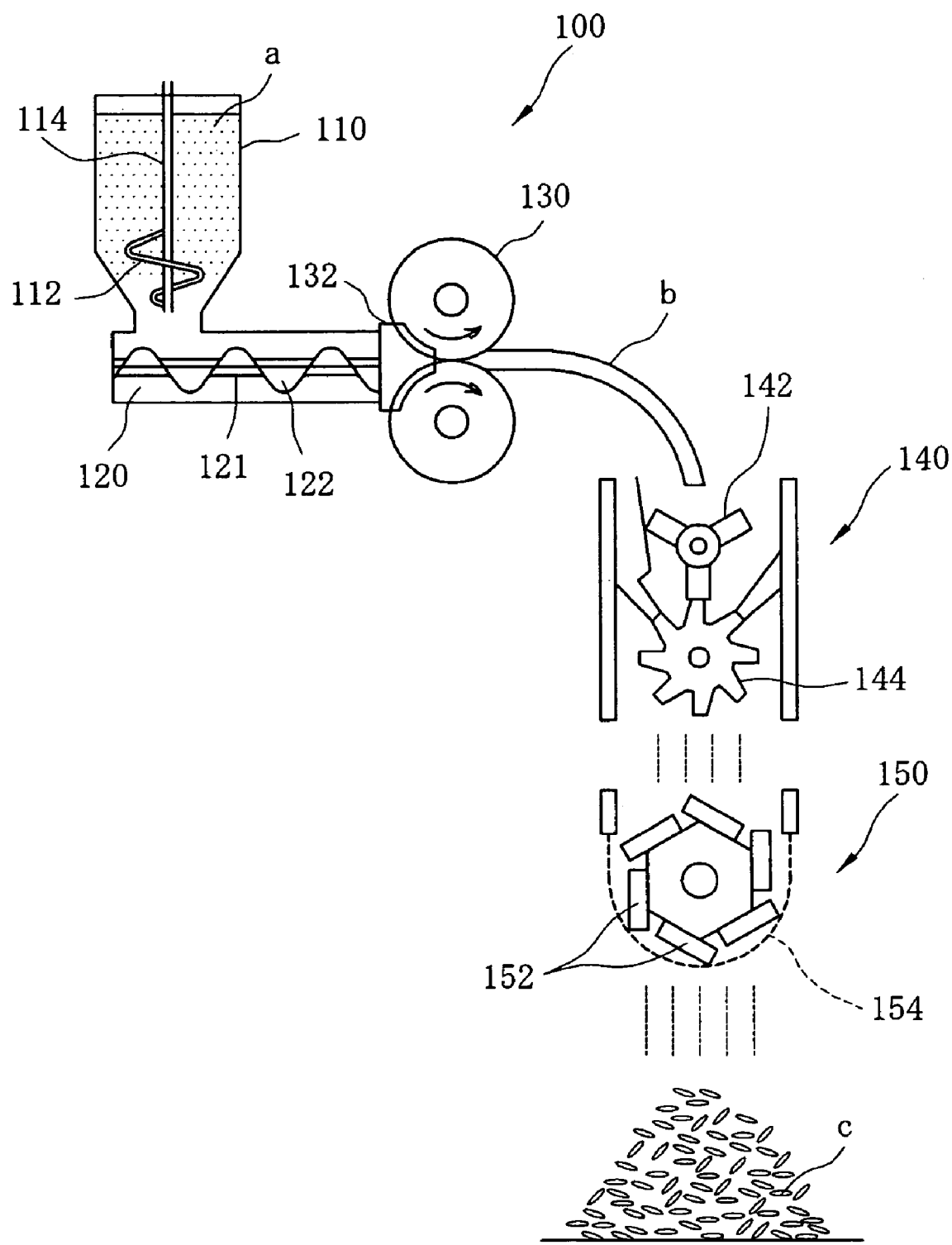
FIG. 1 shows a pelletizer for a method of pelletizing friction material according to the present invention.
Figure 2:
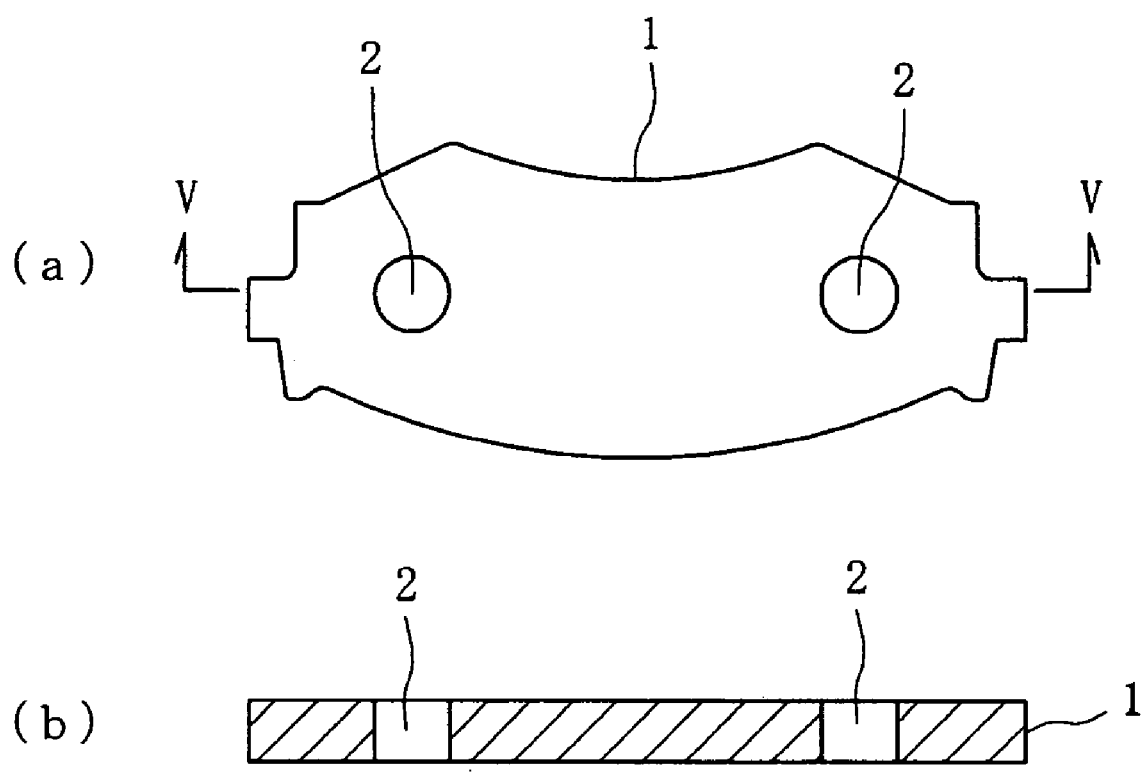
FIG. 2 show a backing plate used for a conventional disk brake pad, in which (a) is a plan view, and (b) a cross-sectional view taken along the line V-V.
Figure 3:
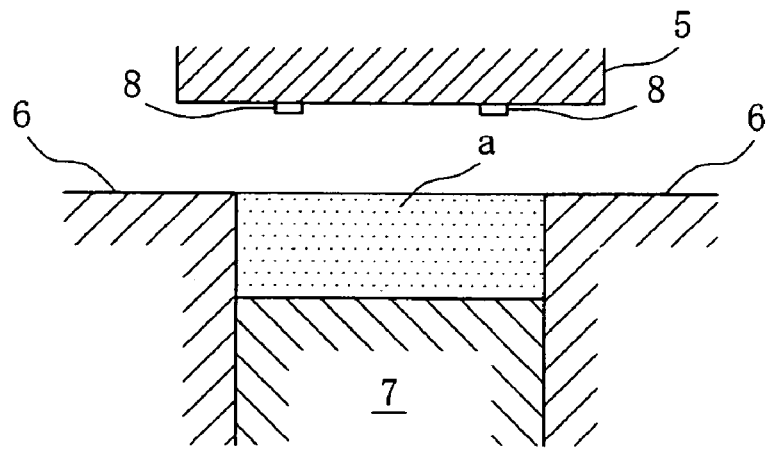
FIG. 3(a) shows the construction of a press for attaching a friction material to a backing plate.
FIG. 3(b) shows a condition that a powdery material is fed to a frame and a steel backing plate is placed on the frame.
FIG. 3(c) shows the condition that the upper die is lowered, and simultaneously a plunger is lifted to heat the material while pressurizing it.
Figure 3:
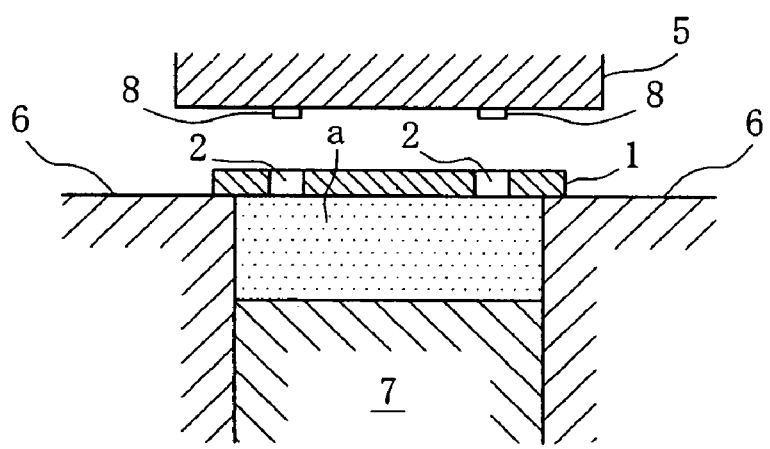
Figure 3:
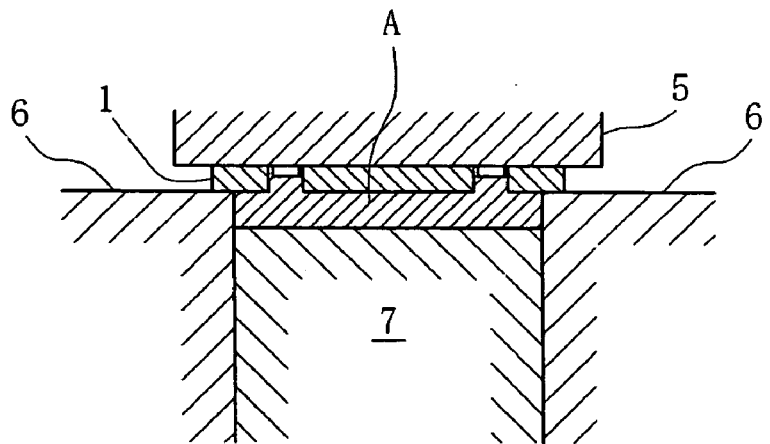
Figure 4:
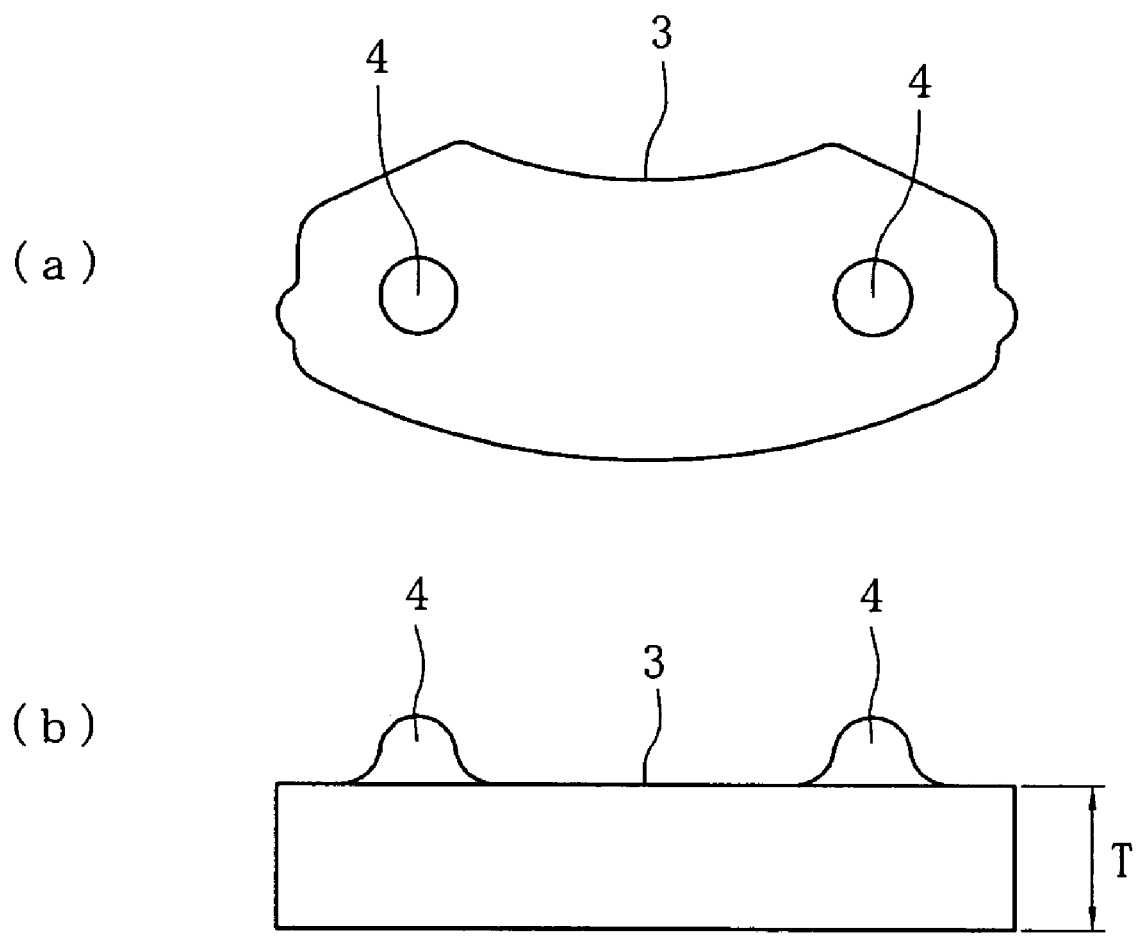
FIG. 4 show a preliminarily formed friction material, in which (a) is a plan view, and (b) is a front view.

FIG. 1 shows the construction of a pelletizer for implementing a method of pelletizing friction material according to the present invention. This pelletizer 100 is the roller compactor (trade name) of TURBO KOGYO CO., LTD. The pelletizer 100 comprises: a cylindrical hopper 110, a screw feeder 120 below the hopper 110, a pair of pressing rollers 130 vertically placed at the outlet of the screw feeder 120, a grinder 140 below the outlet of the pressing rollers 130, and a grader 150 connected to the lower portion of the grinder 140.

In the hopper 110, a spiral agitator 112 is rotatably mounted. The agitator 112 rotates about a shaft 114 to agitate the powdery material in the hopper 110 while preventing the clogging of the hopper 110 and to smoothly feed the material to the screw feeder 120.

The screw feeder 120 is provided with a spiral transportation blade 122 on a horizontally mounted rotation shaft 121 and transports a powdery material a that is fed from the hopper 110 to the next pressing rollers 130.

The pressing rollers 130 comprise a pair of steel rollers that are vertically placed in parallel. One roller is directed to another by an elastic body so as to be pressed to each other and linearly contact with each other. The pressing force is adjustable. In this embodiment, the force was set to be $2.4 \times 10^4$ N/cm. After passing the pressing rollers 130, the material is pressed to be a plate.

The grinder 140 has two grinders, that is, a preliminary grinder 142 and a main grinder 144. The preliminary grinder 142 is provided with many rotation disks on a rotation shaft 142a, and each of the rotation disks has three grinding blades, so that the grinding blades form triple spirals around the rotation shaft 142a. The main grinder 144 also has eight small grinding blades in place of the three grinding blades of the preliminary grinder 142, and each of the grinding blades form eight-ply spirals around the rotation shaft 144a. Rotating the grinding blades allows the material to be ground so as to be fine grains.

The grader 150 is constructed such that a pressure plate 152 is attached to each side of a hexagonal body. A steel net 154 is placed outside of the pressure plates 152. The grains ground by the grinder 140 are pressed to the metal net 154 through the pressure plates 152 to allow the grains to pass through openings of the metal net 154 while being ground, which produces grains with uniform particle size.

Next, the method of pelletizing the friction material will be explained. In the hopper 110, the powdery material a is fed. The powdery material a is produced by mixing fibers, fillers, and binders. Less than or equal to 0.1 to 5.0 weight-percent of solvent is added to the powdery material a. Water may be used as the solvent. When sticky material is added to the powdery material a, the quantity of the solvent added can be reduced to less than or equal to 5 weight-percent, and the lower limit of the quantity can be 0 weight-percent, that is, no solvent may be added. Regardless of the existence of the sticky material, the quantity of the solvent is preferably between 2 and 3 weight-percent.

In this connection, when water is used as the solvent, there is a problem of the relation between the water and water contained in materials in the powdery material a. Hereinafter, the water contained in the powdery material a is indicated as water content in a state of equilibrium at 20° C. and 65% of relative humidity. The quantity of the water added is indicated as the quantity thereof added to the powdery material a containing water in a state of equilibrium at 20° C. and 65% of relative humidity.

The fibers include organic fibers, inorganic fibers, and metal fibers. As the organic fibers, aramid fiber, cellulose fiber, and polyacrylic fiber are used. The inorganic fibers include rock wool, glass fiber, and sepiolite. As the metal fibers, stainless steel fiber, steel fiber, copper fiber, brass fiber, and bronze fiber are used.

The fillers are mixed to increase quantity and weight and provide lubricating effect to achieve stable friction. As the fillers, metal pieces, metal powder, barium silicate, calcium carbonate, graphite, and sticky organic fillers such as synthetic rubber including NBR, and natural rubber are used.

The binders bind the fibers and fillers with each other. Thermosetting resin such as phenol resin and urea resin is used as the binder.

The powdery material a, in which the above materials are mixed, is fed to the hopper 110. The powdery material a fed to the hopper 110 contains a large amount of air and slowly drops in the hopper 110. In this process, the air contained in the material is released due to the pressure of accumulated material at the upper portion of the hopper 110.

The deaerated powdery material a sometimes arches and hardens in the middle in the hopper 110, so that the agitator 112 agitates the material to prevent it. The powdery material a drops in the hopper 110 and reaches the screw feeder 120.

More than or equal to a predetermined quantity of the powdery material a in the hopper 110 allows the quantity of the powdery material a fed to the screw feeder 120 to be constant. The screw feeder 120 transports the powdery material a to the pressing rollers 130 while agitating it, and urges the powdery material a to a feed box 132 at the inlet of the pressing rollers 130.

The powdery material a urged to the feed box 132 enters between the pressing rollers 130 and deaerated to be a band-shaped material b. After discharged from the pressing rollers 130, the band-shaped material b enters the grinder 140 below the pressing rollers 130. The band-shaped material b entering the grinder 140 becomes coarse particles by the preliminary grinder 142 and is ground by the main grinder 144 so as to be finer particles.

Then, the finely ground material enters the grader 150 and is pressed to the metal net 154 by the pressure plates 152, which produces pelletized material c with the same particles size corresponding to the openings of the metal net 154. The pelletized material c formed by the pelletizer 100 is scale-like. This "scale-like" means a plate-like shape with a thick central portion and a thin circumferential portion.

No heater is mounted to the pelletizer 100, so that no heat is applied at all. Pressing with the pressing rollers 130 generates slight heat, but temperature rises up to approximately 60° C. at the highest due to the heat, which does not melt thermosetting resin.

The powdery material a contains sticky substance such as NBR. When compressed, the sticky substance sticks to other substances and becomes solid band-shaped material b. The sticky substance sticks to other substances like soft clay and functions like bonding agent. However, since the sticky substance is not subject to heat, the pelletized material c can be preliminarily formed like the powdery material a.

Further, in the pelletized material c, the sticky substance such as NBR does not exist independently, but is adhered to other substances. As a result, the pelletized material c is not adhered to inner wall of metal mold, which may prevent the shape of the form from being lost in preliminarily forming process.

In the above embodiment, the powdery material a passes between the pressing rollers 130. It is also possible to feed the powdery material a into a metal mold for pressing, and to pressurize the material through a press to produce solid material such as the band-shaped material b, and to grind the material through an appropriate means for pelletization. In this case also, no solvent or a small amount, that is less than or equal to 5 weight-percent of solvent is added, and no heat is applied to the material. When producing ordinary preliminarily formed material, the pressure applied to the powdery material a is between 20 MPa and 70 MPa. When pelletizing the material, pressure several times higher than this, that is, 50 MPa to 300 MPa is applied. This pressure may be substantially the same as loaded to the pressing rollers 130, that is, $5 \times 10^3$ N/cm to $3 \times 10^4$ N/cm.

The diameters of the pellets formed with the pelletizing method according to the present invention are preferably approximately between 1 mm and 4 mm. When the diameter exceeds 4 mm, it becomes difficult to smoothly cut the material by rubbing. When the diameter does not reach 1 mm, fibers will be cut.

In the above embodiment, the powdery material contains sticky material. When pelletized without sticky material, the powdery material could also be pelletized with 0.1 to 5.0 weight-percent of solvent in the same manner as sticky material is added. This is because, as stated above, in the present invention, several times higher pressure is added in preliminarily forming process in comparison to conventional methods.

What is claimed is:

1. A method of pelletizing friction material including a fiber and thermosetting resin, comprising the steps of:
   pressing powdery friction material without melting the thermosetting resin, in which plurality of materials are mixed, with 0.1 to 5.0 weight-percent of solvent; and
   grinding said pressed and hardened material.

2. The method of pelletizing friction material as claimed in claim 1, wherein said pressing step is performed by allowing the powdery friction material to pass between pressing rollers.

3. The method of pelletizing friction material as claimed in claim 1, wherein pressure applied in the pressing step is between 50 MPa and 300 MPa.

4. The method of pelletizing friction material as claimed in claim 2, wherein pressing force applied to said pressing rollers is between $5 \times 10^3$ N/cm and $3 \times 10^4$ N/cm.

5. The method of pelletizing friction material as claimed in claim 1, wherein several kinds of powdery materials with different compositions are used as the powdery friction material, and each of said powdery friction materials is separately pelletized.

6. A method of pelletizing friction material including a fiber and a thermosetting resin, comprising the steps of:
   pressing powdery friction material without melting the thermosetting resin, in which plurality of materials including at least one sticky material are mixed, with less than or equal to 5.0 weight-percent of solvent; and
   grinding said pressed and hardened material.

7. The method of pelletizing friction material as claimed in claim 6, wherein said pressing step is performed by allowing the powdery friction material to pass between pressing rollers.

8. The method of pelletizing friction material as claimed in claim 6, wherein pressure applied in the pressing step is between 50 MPa and 300 MPa.

9. The method of pelletizing friction material as claimed in claim 7, wherein pressing force applied to said pressing rollers is between $5 \times 10^3$ N/cm and $3 \times 10^4$ N/cm.

10. The method of pelletizing friction material as claimed in claim 6, wherein several kinds of powdery materials with different compositions are used as the powdery friction material, and each of said powdery friction materials is separately pelletized.

11. A method of producing a preliminarily formed friction material including a fiber and a thermosetting resin, comprising the steps of:
    pressing powdery friction material without melting the thermosetting resin, in which plurality of materials are mixed, with 0.1 to 5.0 weight-percent of solvent;
    grinding said pressed and hardened material; and
    feeding said pelletized material in a metal mold and pressing said material without heating.

12. The method of producing preliminarily formed friction material as claimed in claim 11, wherein said pressing step is performed by allowing the powdery friction material to pass between pressing rollers.

13. The method of producing preliminarily formed friction material as claimed in claim 11, wherein said pressure applied in the pressing step is between 50 MPa and 300 MPa.

14. The method of producing preliminarily formed friction material as claimed in claim 12, wherein pressing force applied to said pressing rollers is between $5 \times 10^3$ N/cm and $3 \times 10^4$ N/cm.

15. The method of producing preliminarily formed friction material as claimed in claim 11, wherein several kinds of powdery materials with different compositions are used as the powdery friction material, and each of said powdery friction materials is separately pelletized.

16. A method of producing a preliminarily formed friction material including a fiber and a thermosetting resin, comprising the steps of:
    pressing powdery friction material without melting the thermosetting resin, in which plurality of materials including at least one sticky material are mixed, with less than or equal to 5.0 weight-percent of solvent;
    grinding said pressed and hardened material; and
    feeding said pelletized material in a metal mold and pressing said material without heating.

17. The method of producing preliminarily formed friction material as claimed in claim 16, wherein said pressing step is performed by allowing the powdery friction material to pass between pressing rollers.

18. The method of producing preliminarily formed friction material as claimed in claim 16, wherein said pressure applied in the pressing step is between 50 MPa and 300 MPa.

19. The method of producing preliminarily formed friction material as claimed in claim 17, wherein pressing force applied to said pressing rollers is between $5\times10^3$ N/cm and $3\times10^4$ N/cm.

20. The method of producing preliminarily formed friction material as claimed in claim 16, wherein several kinds of powdery materials with different compositions are used as the powdery friction material, and each of said powdery friction materials is separately pelletized.

* * * * *